Patented June 29, 1937

2,085,523

UNITED STATES PATENT OFFICE 2,085,523

SWEETENING PROCESS

Arnold Belchetz, Houston, Tex., and Bernard Richard Carney, Hartsdale, N. Y., assignors to Shell Development Company, San Francisco, Calif., a corporation of Delaware No Drawing. Application May 9, 1935, Serial No. 20,604

5 Claims. (Cl. 196—24)

This invention pertains to the treatment of organic liquid mixtures containing thio-alcohols or mercaptans, and is more specifically concerned with the sweetening of sour hydrocarbon mixtures containing these compounds.

Although it is possible to remove mercaptans by various processes, such as oxidation, scrubbing with caustic soda, etc., the most commonly used practice in removing these compounds is the "doctor process" which consists in agitating the sour material being treated with an aqueous solution of sodium plumbite and a little free sulfur. This process, however, requires a careful control, causes considerable losses of the material being treated, and presents some other difficulties and hazards which it is the purpose of this invention to eliminate.

It has now been found that various agents, such as the oxides or hydroxides of copper, aluminum, manganese, zinc, tin, and especially of iron, in admixture with certain alkaline earth oxides or hydroxides, may be advantageously used for sweetening sour liquid mixtures.

The applicants have found that the use of iron oxide in their process provides considerable advantages over the similar use of litharge in doctor treating.

Thus, a dry reagent may be used, which permits treatment either by percolation or by suspension of the reagent in the distillate. In this way, hazards normally attendant on the use of caustic solutions and lead compounds are avoided.

Further, the reagent is relatively inexpensive as compared with the cost of lead oxide used in ordinary sweetening operations. This reagent can be easily revivified by heating and oxidation without the formation of undesirable by-products.

Finally, when a distillate completely negative to the doctor test is not required, as for example, in the case of certain distillate fuel oils, this process may be used to obtain a marketable product by improving only the odor of the distillate, which, however, may be slightly positive to the doctor test. This control of operations and the resulting economy are not practicable with the usual sweetening reagents.

As already stated, one of the active reagents used according to this invention consists of a mixture of the oxide or hydroxide of a metal particularly such as iron, copper, aluminum, manganese, zinc and tin, and an alkaline earth oxide or hydroxide. This complex reagent may be prepared in a form suitable for the purpose of this invention by any convenient method, as will be shown by the following illustrative example:

100 lbs. of technical ferrous sulfate ($FeSO_4.7H_2O$) are dissolved in 50 to 100 gallons of water, and an excess of commercial slacked lime, for example, 100 lbs. of $Ca(OH)_2$ containing approximately 70% of CaO, is gradually added with stirring, after which the solid matter consisting of ferrous hydroxide, calcium sulfate, lime and water is separated from the suspending water by filtering. The mass is then dried and finely ground in the open air at approximately 120° C., the drying being continued until the weight of the mass is about 200 lbs. The ground mass is then, if desired, passed through a fine sieve, and is ready to be used for the purposes of this invention, a typical composition being:

| | Percent by weight | | | Percent by weight |
|---|---|---|---|---|
| $Fe_2O_3$ | 17 | | $Fe(OH)_3$ | 22.7 |
| $CaSO_4$ | 27 | or | $CaSO_4$ | 27.0 |
| CaO | 25 | | $Ca(OH)_2$ | 33.1 |
| $H_2O$ | 31 | | $H_2O$ | 17.2 |

It has been found that it is preferable to use a reagent containing at least about 5%, but preferably not more than 30% free water, that is water in excess of that required to combine with the iron and calcium oxides. If dehydrated below this point, the reagent's activity is reduced. A reagent from which too much water has been removed may be brought back to its maximum activity by being hydrated either before use or while in contact with the distillate being treated. If desired, some clay or other adsorption agent may be mixed with the reagent to purify the material being treated from various impurities while sweetening it.

It is of course understood that this method of preparing the sweetening reagent is given here only by way of example, and that any other suitable method can equally well be used. For example, a hydrated iron ore may be mixed in a wet state with a hydrated lime, dried to the desired water content and ground to a suitably fine state. Likewise, it is possible to precipitate iron from a ferrous sulfate solution by means of ammonia, while recovering ammonium sulfate. The precipitated iron hydroxide is then mixed with hydrated lime, and the mixture dried and ground as above. These two methods have the advantage of eliminating the presence of relatively large percentages of inert calcium sulfate.

Ferrous sulfate of any origin may be used in preparing the reagent: for example, spent pickling liquor provides a very economical source of this material. When using spent pickling liquor, sufficient lime must be added to neutralize the excess sulfuric acid and to provide 25% free calcium oxide in the final dried reagent, which may therefore contain more calcium sulfate than shown in the composition above. This will, however, not affect the activity of the reagent, calcium sulfate being merely an inert material.

Other soluble salts of iron, such, for example, as ferric chloride as well as the soluble salts of all the other metals hereinbefore specified, may also be used to prepare the reagent.

The prepared reagent may be used to sweeten any organic liquid mixture containing mercaptans, such as synthetic alcohols, ketones, products of hydrogenation, etc., and may be most advantageously applied in treating sour straight run and cracked petroleum distillates such as gasolines, kerosenes, fuel and furnace oils, etc.

The sweetening is effected by contacting the sour distillate and the reagent in the presence of the necessary amount of free or elemental sulfur, which may be dissolved in the sour distillate either before or during its contact with the reagent. This free sulfur may be added in any suitable form, such as, for example, flowers of sulfur, finely powdered sulfur, or as a solution of sulfur in a small portion of the distillate being treated.

The quantity of free sulfur added depends on the degree of sourness of the distillate and on the specifications of the desired final product. Thus, in case of gasolines, when a sweet, non-corrosive product is desired, the amount of sulfur added is determined experimentally to produce gasolines giving both a negative doctor test and a negative corrosion test. The actual amounts of free sulfur usually added in such cases may be seen from the following table, which gives the results obtained in sweetening various distillates by the process of this invention.

| Distillate | F. B. P. °F. | Free sulfur added: % by weight | Doctor test | Copper strip test |
|---|---|---|---|---|
| 1. Cracked gasoline | 400 | 0.005% | Negative | Negative. |
| 2. Reformed gasoline | 370 | 0.009% | do | Do. |
| 3. Str. run gasoline | 400 | 0.03% | do | Do. |
| 4. Kerosene 41° A. P. I. | | 0.10 | do | Do. |

In the case of gas oils, when a complete sweetening is very often not required, the amount of free sulfur added is regulated for improvement of odor only, that is, its amount is calculated to convert only the lighter, more active mercaptans which are responsible for the objectionable odor of the distillate. It is of course obvious that if a distillate contains an amount of free sulfur equal or in excess of the amount calculated as necessary for sweetening, no further addition of sulfur is made.

The contacting of the sour distillate with the reagent in the presence of free sulfur may be effected in any suitable manner such as: by filtration of the sour distillate through towers containing the reagent; by mechanical agitation of the comminuted reagent with the sour distillate; by agitation with compressed air; by circulation of a slurry of the reagent suspended in the distillate, etc.

The contacting is continued until the desired degree of sweetening is effected, whereupon the treated product may be separated from the suspended reagent either by settling or filtration, for example, using clay for that purpose and thereby effecting a further purification of the product by adsorption.

It has been found that it is most economical to carry out this process at normal temperatures; however, in some cases, and especially when treating fuel oils, it may be desirable to use somewhat elevated temperatures, thus increasing the speed of the reaction.

The rate of sweetening is independent of the concentration of free sulfur, provided this concentration is sufficient for complete sweetening, but is proportional to the amounts of the complex reagent used. The speed of the reaction may therefore be controlled by varying these amounts. We have found that very satisfactory results may be obtained by using approximately 2% by weight of the reagent.

Relatively large quantities of sour distillates may be sweetened by the same amount of the reagent before its activity begins to decrease, thereby necessitating longer periods of contact with the distillate. Thus, for example, 7000 gallons of a West-Texas cracked distillate were sweetened with 100 lbs. of the reagent before its efficiency was lowered to the point of requiring reactivation. This loss of efficiency is caused chiefly by the absorption of acidic compounds by the calcium oxide and a gradual formation of ferrous sulfide. The reactivation of the reagent may therefore be very easily effected by blowing the spent reagent first with steam, and then with a mixture of steam and air. Fresh lime may be added, if necessary, after which the reagent may be used to sweeten further amounts of mercaptan-containing liquid mixtures.

We claim as our invention

1. In a sweetening process, the steps of dissolving ferrous sulfate in water, adding slaked lime with stirring, separating the solid mass and drying it to a free water content of at least 5%, but not more than 30%, and contacting the dried mass with a solution containing mercaptans in the presence of an amount of free sulfur sufficient for the complete sweetening of the solution.

2. In a sweetening process, the steps of adding slaked lime while stirring, to a solution of ferrous sulfate in water, separating the solid mass, drying the same to a free water content of at least 5% and not more than 30% and contacting the dried mass with a solution containing mercaptans in the presence of an amount of free sulfur sufficient for the complete sweetening for the solution.

3. In a sweetening process, the steps of adding slaked lime while stirring, to a solution of ferrous sulfate in water, separating the solid mass, drying the same to a free water content of at least 5% and not more than 30% and contacting the dried mass with a sour hydrocarbon oil containing mercaptans in the presence of an amount of free sulfur sufficient for the complete sweetening for the solution.

4. The process of claim 3, wherein the amount of the reagent used is equal to approximately 2% by weight of the oil treated.

5. In a sweetening process, the steps of adding slaked lime while stirring, to a solution of ferrous sulfate in water in an amount sufficient to produce a precipitate containing at least 25% free calcium oxide, drying this precipitate to a free water content of at least 5% and not more than 30% and contacting the dried mass with a solution containing mercaptans in the presence of an amount of free sulfur sufficient for the complete sweetening of the solution.

ARNOLD BELCHETZ.
BERNARD RICHARD CARNEY.